United States Patent [19]

Dugua et al.

[11] Patent Number: 4,904,458

[45] Date of Patent: Feb. 27, 1990

[54] PROCESS FOR THE MANUFACTURE OF SODIUM PERBORATE MONOHYDRATE FROM SODIUM PERBORATE TETRAHYDRATE

[75] Inventors: Jacques Dugua, Charly; Jean-Pierre Cuer, Francheville, both of France

[73] Assignee: Atochem, Paris, France

[21] Appl. No.: 700,714

[22] Filed: Feb. 12, 1985

[30] Foreign Application Priority Data

Mar. 1, 1984 [FR] France .................................. 8403198

[51] Int. Cl.$^4$ ............................................ C01B 35/12
[52] U.S. Cl. .................................................. 423/277
[58] Field of Search ............................ 423/277; 34/15

[56] References Cited

PUBLICATIONS

Z. Chemie 8(7) 278–9 (1968), (QD1.Z415 Lib. Congress).

Robert Perry, *Chemical Engineers' Handbook* 5th edition copyright 1973 McGraw-Hill Inc. N.Y.

*Primary Examiner*—John Doll
*Assistant Examiner*—R. Bruce Breneman
*Attorney, Agent, or Firm*—Sigalos, Levine & Montgomery

[57] ABSTRACT

A process for the manufacture of perborate monohydrate by the dehydration of perborate tetrahydrate at an absolute pressure maintained between 0.03 and 0.13 bar and a temperature of the perborate to be dehydrated not exceeding about 70° C.

3 Claims, No Drawings

PROCESS FOR THE MANUFACTURE OF SODIUM PERBORATE MONOHYDRATE FROM SODIUM PERBORATE TETRAHYDRATE

BACKGROUND OF THE INVENTION

The present invention relates to a process for the manufacture of sodium perborate monohydrate from sodium perborate tetrahydrate.

Sodium perborate of the empirical formula $NaBO_7H_8$; called sodium perborate tetrahydrate, is currently being used in order to obtain washing compositions. It, however, presents characteristics such as, for instance, solution velocity and of temperature stability, which are still insufficient in order to give full satisfaction in this field of use.

Accordingly, so-called sodium perborate monohydrate of empirical formula $NaBO_4H_2$ is becoming increasingly preferred over it. In comparison to sodium perborate tetrahydrate, the monohydrate possesses not only an active oxygen content which is greater by about 50%, but also a more rapid solution velocity and a higher melting temperature.

The known processes for the manufacture of sodium perborate monohydrate from sodium perborate tetrahydrate consist of eliminating from the latter the desired quantity of water of crystallization by means of a hot air current.

In order to ensure a good distribution of the hot air in the mass to be dehydrated and to avoid any great decomposition of the latter, it has generally been proposed to carry out its dehydration by maintaining it in the fluidized state by means of the hot air current.

This is, for instance, the case as far as the procedures described in Belgian Patent No. 718,160 and in French Patent No. 1,081,421 are concerned. The advantage of such procedures is, in fact, to ensure a uniform temperature in the mass to be dehydrated.

However, as indicated by French Patent No. 2,207,859, the dehydration of sodium perborate tetrahydrate by the hot air leads either to a sodium perborate monohydrate having an insufficient abrasion resistance or to a product having an improved abrasion resistance, but then only in a process operating at a temperature which is too high to avoid the fusion (melting) of a part of the load and the presence of "crusts" in the resultant product.

And so the object of French Patent No. 2,207,859 is to obtain a product of better abrasion resistance than that of the products resulting from prior processes with hot air, by yielding only a minimal fusing of the sodium perborate grains. This minimal fusing of the grains is made possible due to a high water vapor content of the hot air in contact with the mass to be dehydrated during the course of all or part of the operation. This high relative humidity is achieved by means of the addition of saturated water vapor to the air at the time of its introduction into the zone of dehydration.

French Addition Certificate No. 2,285,339 to French Patent No. 2,207,859 specifies that the humidity of the air necessary in order to achieve the result of the main patent can be ensured by virtue of the evaporation of the water of crystallization alone, but then it is necessary to carry out the dehydration operation in two stages, the first one of which must be slow.

The processes described in the above French patent and French Addition Certificate present the following drawbacks: causing the formation of fine particles which are carried along by the air and water vapor current and, in order that a large part of the product is not lost, necessitating the separation of these find particles from the gas current and this is an efficient manner and thus costly, and offering, at least locally, a sure risk of total fusing of the grains as a consequence of the principle itself on which these processes are based.

The known processes neither permit achieving a higher production, nor carrying out the operation in homogeneous manner without loss by decomposition, nor, when this stumbling block is avoided, leading to a product of sufficient abrasion resistance, nor, when this property is found to be improved, avoiding a consequent attrition and the risk of fusion of the grains.

SUMMARY OF THE INVENTION

The process according to the invention makes it possible to avoid the drawbacks of the known processes.

It has, in fact, been found that the dehydration of the sodium perborate tetrahydrate is rapid and leads to a sodium perborate monohydrate of high solution velocity and high abrasion resistance when it is carried out under reduced pressure at a suitable temperature.

The process of the invention is characterized by the fact that the dehydration of the sodium perborate tetrahydrate into sodium perborate monohydrate is carried out at an absolute pressure maintained between about 0.03 bar and 0.13 bar and at a temperature of the mass to be dehydrated not exceeding about 70° C., without any gaseous current being allowed to penetrate into the dehydration zone.

DETAILED DESCRIPTION

By operating at an absolute pressure below about 0.03 bar, the dehydration velocity increases even more, but the abrasion resistance of the resultant product becomes insufficient.

By operating at an absolute pressure above about 0.13 bar, the dehydration velocity rapidly becomes too small in order for the grains to remain preserved from the risk of fusion and in order for a sufficiently high industrial productivity rate to be obtained.

Keeping the mass to be dehydrated under reduced pressure is achieved by any known conventional means.

The calories (heat) required for the operation are furnished to the product to be dehydrated by known means such as, for instance, by the circulation of a heat-carrying fluid at the level of the support systems of the mass to be dehydrated and/or of the walls of the reactor, with the aid of fixed or mobile heating elements arranged in the dehydration chamber, or by microwave effect.

The temperature of the perborate mass being dehydrated must be kept below about 70° C. to ensure that no melting or fusing of the perborate occurs; preferably, a temperature of from about 45° C. to 70° C.

The process of the invention can be carried out continuously or discontinuously in any apparatus making it possible to work at the pressures maintained within the limits defined for the invention and equipped with a sodium perborate grain distribution system such that it ensures a homogeneous temperature in the mass to be dehydrated. Such apparatuses are, for instance, belt or plate dryers equipped with scrapers or other agitation means, or vibrating dryers or revolving furnaces. The material most usually selected in order to constitute such apparatuses suitable for the invention is stainless steel.

The invention will be further described in connection with the following examples which are set forth for purposes of illustration only.

The values indicated in these examples under the term "abrasion wear ratio" were determined as follows: 50 g of the perborate are subjected for 6 minutes to the action of 8 stainless steel balls of 20 mm diameter contained in a horizontal stainless steel cylinder, having an internal diameter of 100 mm and a length of 115 mm, turning at a speed of 150 revolutions/minute (RPM). The abrasion wear ratio is then evaluated as being the weight percentage of perborate having a granulometry below 53 $\mu$m.

The specific surface measurements of the fabricated product, carried out according to the BET method show that the process of the invention leads to a sodium perborate monohydrate which can have a specific surface below 10 $m^2/g$ and generally even between 4 and 7 $m^2/g$.

In each of the examples below, the yield by weight of perborate monohydrate obtained in relation to the perborate tetrahydrate involved is practically quantitative.

EXAMPLE 1

1.6 kg of dry sodium perborate tetrahydrate, whose active oxygen content is 10.2% by weight and whose abrasion wear ratio is 4.5%, are arranged on the surface of 0.1 $m^2$ of a tray equipped with a rotatable scraper having 4 blades inside of a jacketed chamber. The chamber is placed under an absolute pressure of 0.08 bar by means of a pump, heating is effected by the circulation of a heat-carrying fluid in a jacket about the chamber.

The chamber is heated so that dehydration of the perborate tetrahydrate takes place at a temperature from 58° C. to 63° C.

The operation, during which the water vapor formed is condensed on the exterior of the chamber, is stopped after 30 minutes.

The perborate monohydrate collected after being placed under atmospheric pressure and rapid cooling contains 15% by weight of active oxygen and has a specific surface of 4.1 $m^2/g$, a solution velocity of 100% in less than 1 minute, and an abrasion wear ratio of 7.9%.

EXAMPLE 2

Proceeding as in Example 1, but at a temperature of the mass to be dehydrated to 55° C. to 61° C. for 45 minutes, the perborate monohydrate obtained contains 15.8% by weight of active oxygen and has a specific surface of 6.3 $m^2/g$, a solution velocity of 100% in less than 1 minute, and an abrasion wear ratio of 4.7%.

EXAMPLE 3

Proceeding under the same pressure and temperature conditions as in Example 2, but with 2.2 kg of perborate tetrahydrate containing 8% by weight of water and a dehydration operation duration of 75 minutes, the perborate monohydrate obtained contains 15.7% by weight of active oxygen and has a specific surface of 6.1 $m^2/g$, a solution velocity of 100% in less than 1 minute, and an abrasion wear ratio of 4.3%.

EXAMPLE 4

1.3 kg of the perborate tetrahydrate of Example 1 is dehydrated as in Example 2, but under an absolute pressure of 0.09 bar. The perborate monohydrate obtained contains 15.6% by weight of active oxygen, has a solution velocity of 100% in less than 1 minute, and has a specific surface of 4.8 $m^2/g$ and an abrasion wear ratio of 4.3%.

EXAMPLE 5

Operating as in Example 4, but at an absolute pressure of 0.035 bar and at a temperature of the mass to be dehydrated of 50° C. to 58° C., the perborate monohydrate obtained contains 15.6% by weight of active oxygen, has a solution velocity of 100% in less than 1 minute, has a specific surface of 8.2 $m^2/g$, and an abrasion wear ratio of 7.8%.

EXAMPLE 6

The dehydration of 0.8 kg of perborate tetrahydrate of Example 1 at an absolute pressure of 0.03 bar and a temperature of the mass to be dehydrated of 46° C. to 57° C. for 50 minutes leads to a perborate monohydrate whose active oxygen content is 15.5% by weight, complete solution velocity is less than 1 minute, specific surface is 9.0 $m^2/g$, and the abrasion wear ratio is 5%.

EXAMPLE 7

The dehydration of 1.3 kg of sodium perborate tetrahydrate at a pressure of 0.13 bar for 50 minutes took place at between 62° C. and 67° C. and led to a sodium perborate monohydrate having an active oxygen content of 15.5% by weight, a specific surface of 3.9 $m^2/g$, a solution velocity of 100% in less than 1 minute, and an abrasion wear ratio of 4.2%.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims

What is claimed is:

1. A process for the manufacture of sodium perborate monohydrate by the dehydration of sodium perborate tetrahydrate, comprising carrying out the dehydration in an area where the absolute pressure is maintained between 0.03 and 0.13 bar and at a temperature of the perborate mass to be dehydrated not exceeding about 70° C., without any gaseous current being allowed to penetrate into said dehydration area.

2. The process of claim 1, wherein temperature of the perborate mass is maintained between about 45° C. and 70° C.

3. The process of claim 1 or 2, wherein the perborate is agitated during dehydration to maintain a homogeneous temperature in the mass of perborate during dehydration.

\* \* \* \* \*